(12) United States Patent
Streitman

(10) Patent No.: US 12,487,851 B1
(45) Date of Patent: Dec. 2, 2025

(54) CRON-BASED ROUTING MACHINES AND PROCESSES TO SCHEDULE AND EXECUTE JAVA CODE EXCERPTS ACROSS FAULT-TOLERANT LOAD-BALANCED DISTRIBUTED SERVERS RUNNING JVM NAMESPACES

(71) Applicant: Bank of America Corporation, Charlotte, NC (US)

(72) Inventor: Mark Streitman, East Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 735 days.

(21) Appl. No.: 17/901,066

(22) Filed: Sep. 1, 2022

(51) Int. Cl.
*G06F 9/48* (2006.01)
*G06F 9/455* (2018.01)

(52) U.S. Cl.
CPC ........ *G06F 9/4881* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 7,720,804 B2 | 5/2010 | Fazal et al. | |
| 7,870,016 B2 | 1/2011 | Fazal et al. | |
| 7,895,226 B2 * | 2/2011 | Koch | G06F 16/24528 707/763 |
| 7,899,915 B2 | 3/2011 | Reisman | |
| 8,768,877 B2 | 7/2014 | Bhatia et al. | |
| 9,081,875 B2 | 7/2015 | James et al. | |
| 9,563,670 B2 | 2/2017 | Wasson et al. | |
| 10,616,203 B2 | 4/2020 | Hankins et al. | |
| 10,680,958 B2 | 6/2020 | Guan et al. | |
| 10,778,543 B2 | 9/2020 | Guan et al. | |
| 11,025,513 B2 | 6/2021 | Guan et al. | |
| 2016/0055143 A1 | 2/2016 | Goel et al. | |
| 2017/0063907 A1 | 3/2017 | Muddu et al. | |
| 2018/0074852 A1 * | 3/2018 | Bishop | G06F 9/542 |
| 2019/0238424 A1 | 8/2019 | Guan et al. | |
| 2020/0082319 A1 * | 3/2020 | Gouw | G06Q 10/06315 |
| 2022/0036469 A1 * | 2/2022 | Hanan | G06Q 40/08 |

FOREIGN PATENT DOCUMENTS

| | | | |
|---|---|---|---|
| CA | 2492591 A1 | 2/2004 | |
| CN | 106663143 B | 12/2019 | |

OTHER PUBLICATIONS

Belviranli, et al., Juggler: A Dependence-Aware Task-Based Execution Framework for GPUs; In Proceedings of PPoPP '18: 23nd ACM SIGPLAN Symposium on Principles and Practice of Parallel Programming (PPoPP '18), ACM New York, NY USA, 14 pages; 2018.

* cited by examiner

*Primary Examiner* — Eric C Wai
(74) *Attorney, Agent, or Firm* — Banner & Witcoff, Ltd.

(57) ABSTRACT

A routing process schedules and executes Java code excerpts across backend servers. A route table contains routes to be executed in JVM namespaces on servers and identifies for each route a Jar file containing applicable classes and methods to be executed at a CRON time. During execution, methods are retrieved from each applicable class and are executed to extract data from backend devices. The servers transform the extracted data into frontend data and load it onto frontend storage devices. Only the classes and methods in the Jar file for a route need be executed. Complete Java programs need not be run.

20 Claims, 17 Drawing Sheets

First Sample Routing Table (250)

| CRON | NameSpace | RouteName | Location of Code |
|---|---|---|---|
| 0+0/5+* | NS1 | Route1 | Disk location1, Jar File1, Class1, Method1 |
| 5+0/5+* | NS1 | Route2 | Disk location2, Jar File2, Class2, Method2 |
| 10+0/5+* | NS2 | Route3 | Disk location3, Jar File3, Class3, Method3 |
| 15+0/5+* | NS2 | Route4 | Disk location4, Jar File4, Class4, Method4 |
| 20+0/5+* | NS3 | Route5 | Disk location5, Jar File5, Class5, Method5 |
| 25+0/5+* | NS4 | Route6 | Disk location6, Jar File6, Class6, Method6 |
| 30+0/5+* | NS5 | Route7 | Disk location7, Jar File7, Class7, Method7 |
| 35+0/5+* | NS6 | Route8 | Disk location8, Jar File8, Class8, Method8 |
| 40+0/5+* | NS6 | Route9 | Disk location9, Jar File9, Class9, Method9 |

FIG. 2C

Alternate Sample Routing Table (270)

| QUARTZ | | TIMER | JARNAME | CLASSPATH |
|---|---|---|---|---|
| cron=0+0/5+*+*+*+?&trigger.timeZone=America/New_York | | NULL | myapp.jar | Com.something.project |

| METHODNAME | PARAMETERS | ROUTENAME | DIRECTORY | NAMESPACE |
|---|---|---|---|---|
| doPolyRoots | {"a":1,"b":-2,"c":-23,"d":64} | R4 | /opt/group/Juggler/apps | MY_NAMESPACE |

FIG. 2D

Sample Process Flow for Running Target Code Using Route Table Data of FIG. 2D

Sample Java Code Excerpt/Snippet for Execution by JVM (Part A)

```java
public class ReflectionDemo {
    private static HashMap<String, ClassLoader> classLoaderMap = new HashMap<String, ClassLoader>();

public final static String DISPLAYTIMEZONE = "America/New_York";

// this can be executed a method in any class
    public void executeReflection(String jarName, String classPath, String methodName, String parameters,
            String directory, String processName2, String id, String routeName) {
        // create a file filter for Jar files
        FilenameFilter filter = new FilenameFilter() {

@Override
            public boolean accept(File dir, String name) {
                if (name.lastIndexOf('.') > 0) {
                    // get last index for '.' char
                    int lastIndex = name.lastIndexOf('.');

// get extension
                    String str = name.substring(lastIndex);

// match path name extension
                    if (str.equals(".jar")) {
                        return true;
                    }
                }
                return false;
            }
        };
        int numParams = 0;
        // parameters exist or they don't, if they do, they they are either a
        // number or a string
        HashMap<String, String> parameterMap = new HashMap<>();
        List<String> parmNames = new ArrayList<String>();
        if (!parameters.isEmpty()) {
            // reflection section to execute the method
```

FIG. 10A

Sample Java Code Excerpt/Snippet for Execution by JVM (Part B1)

```java
                ObjectMapper mapper = new ObjectMapper();
                parameterMap = mapper.readValue(parameters, new TypeReference<HashMap<String,
String>>() {
                });
                numParams = parameterMap.size();
                numParams = parameterMap.size();

// need to get the parameter names in order
                Set<String> parmKeys = parameterMap.keySet();
                parmKeys.forEach(key -> {
                        parmNames.add(key);
                });
                // sort the names because there is a chance they are not ordered
                Collections.sort(parmNames);
        }
        // section for using reflection to execute the method of the class
        // create instance of "Class"

// if the directory has already been loaded and has a ClassLoader in the map
        // then just use the one already saved, if not create on from the directory
        ClassLoader loader = classLoaderMap.get(directory);
        if (loader == null) // create a new classloader for this class
        {
                loader = getClassLoader(directory, filter);
                classLoaderMap.put(directory, loader); // save the new classloader
        }
```

FIG. 10B1

Sample Java Code Excerpt/Snippet for Execution by JVM (Part B2)

```java
// the main JVM ClassLoader
Class<?> runClass = null;
runClass = loader.loadClass(classPath);
runClass.newInstance();
Method genericMethod = null;

Method[] methods = runClass.getMethods(); // get all the methods in this class and superclasses
// find the method that matches the parameters and the name
boolean found = false;
for (Method method : methods) {
    // make sure the name and the number of parameters are the same
    if (method.getName().trim().equals(methodName.trim()) &&
method.getParameterTypes().length == numParams) {
        genericMethod = method;
        found = true;
        break;
    }
    if (method.getParameterTypes().length == 0) {
        continue;
    }
    // 1 Map parameter
    if (method.getParameterTypes()[0].toString().equals("interface java.util.Map")
            && method.getName().trim().equals(methodName.trim())) {
        genericMethod = method;
        found = true;
        numParams = 1;
```

FIG. 10B2

Sample Java Code Excerpt/Snippet for Execution by JVM (Part C)

```
                                        break;
                                }
                        }
                        if (found == false) {
                                return;
                        }

// create the parmeters needed for the call to the method
                        if (numParams > 0) {
                                Type[] parmTypes = genericMethod.getParameterTypes();
                                Object[] args = new Object[numParams];

// passing a map as a parameter
                                if (parmTypes[0].toString().equals("interface java.util.Map") && numParams == 1) {
                                        args[0] = parameterMap;
                                } else {
                                        for (int i = 0; i < numParams; i++) {
                                                String param = parmNames.get(i);
                                                Type parmType = parmTypes[i];
                                                String parmName = parmType.toString();
                                                String strParm = parameterMap.get(param);

switch (parmName) {
                                                case "class org.joda.time.DateTime":
                                                        if (strParm.equals("CURRENTDATE")) // insert the current
date when this is in the parameterlist
                                                        {
                                                                args[i] = new DateTime();
                                                                break;
                                                        }
                                                case "class java.lang.String":
                                                        String str = parameterMap.get(param);
                                                        String date = testDate(str);

if (date != null) {
                                                                args[i] = date; // the parameter was a date format
string, got real date
                                                        } else {
                                                                args[i] = str;
                                                        }
                                                        break;
                                                case "class java.lang.Integer":
                                                case "int":
                                                        args[i] = Integer.parseInt(strParm);
                                                        break;
                                                case "class java.lang.Long":
                                                case "long":
                                                        Long millis = testMillis(strParm); // is this a millis indicator
                                                        if (millis != null) {
                                                                args[i] = millis; // the parameter was a millisecond
formated string, got real date in millis
                                                        } else {
```

FIG. 10C

Sample Java Code Excerpt/Snippet for Execution by JVM (Part D)

```
                                break;
                        }
                }
                if (found == false) {
                        return;
                }

// create the parmeters needed for the call to the method
                if (numParams > 0) {
                        Type[] parmTypes = genericMethod.getParameterTypes();
                        Object[] args = new Object[numParams];

// passing a map as a parameter
                        if (parmTypes[0].toString().equals("interface java.util.Map") && numParams == 1) {
                                args[0] = parameterMap;
                        } else { for (int i = 0; i < numParams; i++) {
                                        String param = parmNames.get(i);
                                        Type parmType = parmTypes[i];
                                        String parmName = parmType.toString();
                                        String strParm = parameterMap.get(param);

switch (parmName) {
                                        case "class org.joda.time.DateTime":
                                                if (strParm.equals("CURRENTDATE")) // Insert the current
date when this is in the parameterlist
                                                {
                                                        args[i] = new DateTime();
                                                        break;
                                                }
                                        case "class java.lang.String":
                                                String str = parameterMap.get(param);
                                                String date = testDate(str);

if (date != null) {
                                                        args[i] = date; // the parameter was a date format
string, got real date
                                                } else {
                                                        args[i] = str;
                                                }
                                                break;
                                        case "class java.lang.Integer":
                                        case "int":
                                                args[i] = Integer.parseInt(strParm);
                                                break;
                                        case "class java.lang.Long":
                                        case "long":
                                                Long millis = testMillis(strParm); // is this a millis indicator
                                                if (millis != null) {
                                                        args[i] = millis; // the parameter was a millisecond
formated string, got real date in millis
                                                } else {
```

FIG. 10D

Sample Route Startup with CRON (Part A)

```java
public void setRoute(RouteBuilder rbo, RouteDefinitionDAO route) {
    String routeName = route.getRouteName();
    ReportRecord rr = SystemProps.getRouteMap(routeName);
    if (rr == null) // add a new Route Report Record
    {
        rr = new ReportRecord();
        rr.setRouteName(routeName);
        rr.setRouteStarted(new DateTime());
        rr.setNbkId(route.getNBK());
        rr.setParameters(route.getParameters());
        rr.setNameSpace(route.getNameSpace());
        rr.setActive(route.getActive());
        SystemProps.setRouteMap(routeName, rr);
    }
    String from = null;
    if (route.getTimer() != 0) {
        from = "timer://poll?period=" + route.getTimer() + "&repeatCount=0";
    } else if (route.getQuartz() != null && !route.getQuartz().trim().equals("")) {
        from = "quartz2://" + route.getRouteName() + "?" + route.getQuartz();
        from = from.replaceAll("[\r\n]", ""); // junk gets into the fields and needs to be removed
    }
    String parameters = route.getParameters();
    if (parameters == null) {
        parameters = "";
    }
```

FIG. 11A

Sample Route Startup with CRON (Part B)

```
                    rbo.from(from).noAutoStartup().threads(1).routeId(routeName).setProperty("JarName",
rbo.constant(route.getJarName()))
                                        .setProperty("ClassPath",
rbo.constant(route.getClassPath())).setProperty("MethodName", rbo.constant(route.getMethodName()))
                                        .setProperty("Directory",
rbo.constant(route.getDirectory())).setProperty("JVMName", rbo.constant(route.getNameSpace().toString()))
                                        .setProperty("Parameters", rbo.constant(parameters))
                                        // .setProperty("Server",rbo.constant(route.getServer()))
                                        .setProperty("LastUpdateDate",
rbo.constant(route.getLastUpdate())).setProperty("RouteName", rbo.constant(routeName))
                                        .process(new ExecuteReflection());
                    rr.setRouteStarted(new DateTime());
        } else {
                    rbo.from(from).threads(1).routeId(routeName).setProperty("JarName",
rbo.constant(route.getJarName()))
                                        .setProperty("ClassPath",
rbo.constant(route.getClassPath())).setProperty("MethodName", rbo.constant(route.getMethodName()))
                                        .setProperty("Directory",
rbo.constant(route.getDirectory())).setProperty("JVMName", rbo.constant(route.getNameSpace().toString()))
                                        .setProperty("Parameters", rbo.constant(parameters))
                                        // .setProperty("Server",rbo.constant(route.getServer()))
                                        .setProperty("LastUpdateDate",
rbo.constant(route.getLastUpdate())).setProperty("RouteName", rbo.constant(routeName))
                                        .process(new ExecuteReflection());
                    rr.setRouteStarted(new DateTime());
        }
```

FIG. 11B

CRON-BASED ROUTING MACHINES AND PROCESSES TO SCHEDULE AND EXECUTE JAVA CODE EXCERPTS ACROSS FAULT-TOLERANT LOAD-BALANCED DISTRIBUTED SERVERS RUNNING JVM NAMESPACES

TECHNICAL FIELD OF DISCLOSURE

The present disclosure relates to backend electrical computers and digital processing systems for virtual machine tasks, process management, and task management/control with mutual exclusion mechanisms to extract, transform, and load data from myriad source machines or datastores via distributed fault-tolerant load-balanced computer system architecture to securely synchronize data and store data across multiple processes for presentation to frontend devices.

BACKGROUND

In distribution computing systems where data needs to be extracted from myriad backend machines and datastores, transformed (e.g., cleaned, sanitized, scrubbed, put into a uniform format), and loaded into an output data container or the like for presentation to, access by, or use by frontend machines or systems, technical problems and substantial limitations exist in traditional extract/transform/load (ETL) computing processes when the quantity of back-end sources from which data is to be extracted is extremely large. As an example, in some companies, the number of back-end systems from which extraction is required can easily exceed hundreds of thousands (100,000+) of individual personal computers, servers, splunk systems, databases, datastores, spreadsheets, tables, or the like, and many requests for data from tens of thousands (10,000+) of users may be made of many different data sources on one or more of each of the foregoing, which increases the extraction demands even more. Each such request may be its own process, Java program, or the like.

This presents enormous computing resource and processing demands especially since ETL processes can run very frequently on recurring schedules either as single jobs or aggregated into a batch of jobs, and more jobs or tasks can be added to the schedule very frequently such that the demands are ever increasing.

It is very difficult and resource intensive to juggle scheduling and execution of so many tasks to access and transform data from one or more of the foregoing, wherein each task requires processing of its own complete computer program (e.g., a standalone Java program or the like) that needs to be executed in its entirety each time it is triggered in an ETL schedule.

Additionally, schedules and programs often must be manually added by an operator which is labor intensive and prone to user error. This further complicates scheduling and execution of required ETL jobs, and collectively presents tremendous technological problems and potentially unsustainable and unsatisfiable ever-increasing parallel processing and juggled scheduling requirements and resources.

Even further complications arise since one or more backend systems may crash or become unavailable at any given time and may do so during execution of large Java programs. Monitoring faults or unavailable systems in real-time and then failing over and re-executing the entirety of large Java programs adds to the problems of existing ETL systems, architectures, and processes. This may result in thousands of rogue standalone programs trying to run at the same time thereby presenting even more processing and security issues.

In existing ETL systems, hundreds or thousands of individual extractions may be performed in many ways, all of which have their own unique problems. They may be performed by individual standalone programs, which are very difficult to start, stop, and coordinate; have no redundancy capability or ability to failover; consume and require a large use of resources; and require each program to individually deal with logging, security, and data storage separately. They may also be implemented through proprietary commercial applications that, for example, provide graphical interfaces to perform ETL and are limited in that they cannot use open source libraries such as with regular programming languages (like Java). They may also be implemented as open source frameworks to run ETL programs, but these all require a level of programming capability and comprehensive/complete programs (as opposed to code excerpts) to be executed and to integrate them into complete systems. There are also existing programs that run software at periodic intervals, but each such program must be a standalone executable program only and must similarly handle its own security, building, and logging itself.

Hence there is a long felt and unsatisfied need in the field of ETL scheduling and parallel processing systems for backend electrical computers and digital processing systems to handle virtual machine tasks, process management, and task management/control to extract, transform, and load data from myriad source machines or datastores via fault-tolerant load-balanced distributed computer system architecture to securely synchronize critical data across multiple processes, servers, virtual machines or the like, for storage and presentation to, access by, or use by frontend devices.

SUMMARY

In accordance with one or more arrangements of the disclosures contained herein, solution(s) are provided to address one or more of the shortcomings in the field of ETL scheduling and parallel processing systems by, inter alia, providing a routing process that schedules and executes Java code excerpts across backend servers. A route table contains routes to be executed in JVM namespaces on servers and identifies for each route a Jar file containing applicable classes and methods to be executed at a CRON time. During execution, methods are retrieved from each applicable class and are executed to extract data from backend devices. The servers transform the extracted data into frontend data and load it onto frontend storage devices. Only the classes and methods in the Jar file for a route need be executed. Complete Java programs need not be run.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a CRON-based routing process to schedule and execute Java code excerpts across backend fault-tolerant load-balanced distributed servers can import, to a CRON server, a routing table containing routes to be executed in Java Virtual Machine (JVM) namespaces, each of said routes identifying a Jar file in which one or more classes having one or more methods are to be executed with one or more parameters at CRON times corresponding to said routes. The CRON server can elect a primary server and designate a plurality of secondary servers. The primary server can allocate the JVM namespaces across the primary server and the secondary servers. The primary and secondary servers can start the routes to be executed in the JVM namespaces at route CRON start time. Within the JVM namespaces, said one or more methods in one or classes using said one or more parameters at the CRON times for each of said routes is executed to extract backend data from backend sources. The primary server and the secondary servers transform the backend data into frontend data, and load the frontend data into frontend-accessible storage to make it available for frontend clients.

In some arrangements, each Jar file need only contain said one or more classes and said one or more methods for the Jar file's corresponding route.

In some arrangements, a CRON-based routing process to schedule and execute Java code excerpts across backend fault-tolerant load-balanced distributed servers comprises the steps of: loading, to a routing table on a CRON server, a first route to be executed in a first Java Virtual Machine (JVM) namespace, said first route identifying a first classpath and a first Jar file in which a first class having one or more first methods are to be executed with one or more first parameters at a first CRON time; loading, to a routing table on a CRON server, a second route to be executed in a second Java Virtual Machine (JVM) namespace, said second route identifying second classpath and a first Jar file in which a second class having one or more second methods are to be executed with one or more second parameters at a second CRON time; electing, by the CRON server, a primary server; designating, by the CRON server, a secondary server; allocating, by the primary server, the first JVM namespace for the first route to the primary server and the second JVM namespace for the second route to the secondary server; starting the first route in the first JVM namespace and the second route in the second JVM namespace; utilizing, by the first JVM namespace at the first CRON time, the first classpath to find the first class in the first Jar; retrieving, by the first JVM namespace, said one or more first methods and said one or more first parameters for said first route; executing, by the first JVM namespace for said first route, said one or more first methods using said one or more first parameters to extract first backend data from one or more first backend devices; transforming, by the primary server, the first backend data into first frontend data; loading, by the primary server into frontend storage, the first frontend data; utilizing, by the second JVM namespace at the second CRON time, the second classpath to find the second class in the second Jar; retrieving, by the second JVM namespace, said one or more second methods and said one or more second parameters for said second route; executing, by the second JVM namespace for said second route, said one or more second methods using said one or more second param-eters to extract second backend data from one or more second backend devices; transforming, by the primary server, the second backend data into second frontend data; and loading, by the secondary server into said frontend storage, the second frontend data.

In some arrangements, a first Jar file need only contain for first route execution the first class and one or more first methods, and a second Jar file need only contain for second route execution the second class and one or more second methods.

In some arrangements, a CRON-based routing process to schedule and execute Java code excerpts across backend fault-tolerant load-balanced distributed servers running Java Virtual Machine (JVM) namespaces can perform the steps of: loading, by a first client into routing table on a CRON server, a first job request containing first fields for a first CRON execution time, a first namespace, a first route name, and first code location indicia identifying a first disk location, a first Jar file containing first partial Java code, a first Java class, and a first Java method; loading, by a second client into the routing table on the CRON server, a second job request containing second fields for a second CRON execution time, a second namespace, a second route name, and second code location indicia identifying a second disk location, a second Jar file containing second partial Java code, a second Java class, and a second Java method; loading, by a third client into the routing table on the CRON server, a third job request containing third fields for a third CRON execution time, a third namespace, a third route name, and third code location indicia identifying a third disk location, a third Jar file containing third partial Java code, a third Java class, and a third Java method; and loading, by a fourth client into the routing table on the CRON server, a fourth job request containing fourth fields for a fourth CRON execution time, a fourth namespace, a fourth route name, and fourth code location indicia identifying a fourth disk location, a fourth Jar file containing fourth partial Java code, a fourth Java class, and a fourth Java method.

During operation, the process may also perform the steps of: electing, by the CRON server, a first server as a primary server; assigning, by the CRON server as secondary servers, a second server, a third server, and a fourth server; storing, by the CRON server in a server and IP address table, a server identifier, a primary/secondary designation, and an IP address for each of said first server, said second server, said third server, and said fourth server; allocating, by the primary server to itself and by the primary server to the secondary servers, a first JVM namespace on the primary server, a second JVM namespace on the second server, a third JVM namespace on the third server, and a fourth JVM namespace on the fourth server; executing, in the first JVM namespace at said first CRON execution time, said first partial Java code from the first Jar file to extract first data from one or more backend machines; executing, in the second JVM namespace at said second CRON execution time, said second partial Java code from the second Jar file to extract second data from said one or more backend machines; executing, in the third JVM namespace at said third CRON execution time, said third partial Java code from the third Jar file to extract third data from said one or more backend machines; and executing, in the fourth JVM namespace at said fourth CRON execution time, said fourth partial Java code from the fourth Jar file to extract fourth data from said one or more backend machines.

The process may further perform the steps of: transforming, by the first JVM namespace, the first data into first frontend data; transforming, by the second JVM namespace, the second data into second frontend data; transforming, by the third JVM namespace, the third data into third frontend data; transforming, by the fourth JVM namespace, the fourth data into fourth frontend data; loading, by the first server, the first frontend data into frontend-accessible data storage; loading, by the second server, the second frontend data into said frontend-accessible data storage; loading, by the third server, the third frontend data into said frontend-accessible data storage; and loading, by the fourth server, the fourth frontend data into said frontend-accessible data storage.

In some arrangements, frontend data that has been transformed from backend data and stored on frontend-accessible data storage may be made available for use by frontend clients in a dashboard, web page, or any other desired viewing mechanism.

In some arrangements, the CRON server may detect a fault condition in a primary server, remove the primary server from the server and IP address table, elect a new primary server, and update the table with the new primary server. The new primary server may reassign JVM namespaces after election.

In some arrangements, if a fault is detected, in the primary server (a/k/a MOM), the record in the server table need not be deleted. A new primary server can be chosen through a defied succession order. The database record can be left in place. No server records need to be removed, and the Primary server will just ignore those not active.

In some arrangement, all the servers constantly report their heartbeat (message of their OK status) to the Primary server. If that heartbeat stops for some period of time, then the primary server (a/k/a MOM) will assume that server is down and stop distributing Namespaces to that server, but will redistribute the Namespaces to the surviving machines. If and when that formerly down server starts sending heartbeats for a set period of time, then the primary can redistribute the namespaces to that newly revived server.

In some arrangements, loads may be balanced based on server capabilities and/or route resource consumption requirements.

In some arrangements, backend data may be transformed into frontend data by data sanitization or conversion to one or more common formats.

In some arrangements, one or more various steps of processes disclosed herein can be implemented in whole or in part as computer-executable instructions stored on computer-readable media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIGS. 2C-D are a sample routing tables that can be utilized in conjunction with one or more ETL or other aspects of this disclosure.

FIGS. 10A, 10B1, 10B2, 10C, and 10D show a sample Java code excerpt/snippet for execution by JVM namespaces of the type that could be used in conjunction with one or more ETL or other aspects of this disclosure.

FIGS. 11A and 11B are sample Java route startups with CRON that could be used in conjunction with one or more aspects of this disclosure.

DETAILED DESCRIPTION

Figure 1:
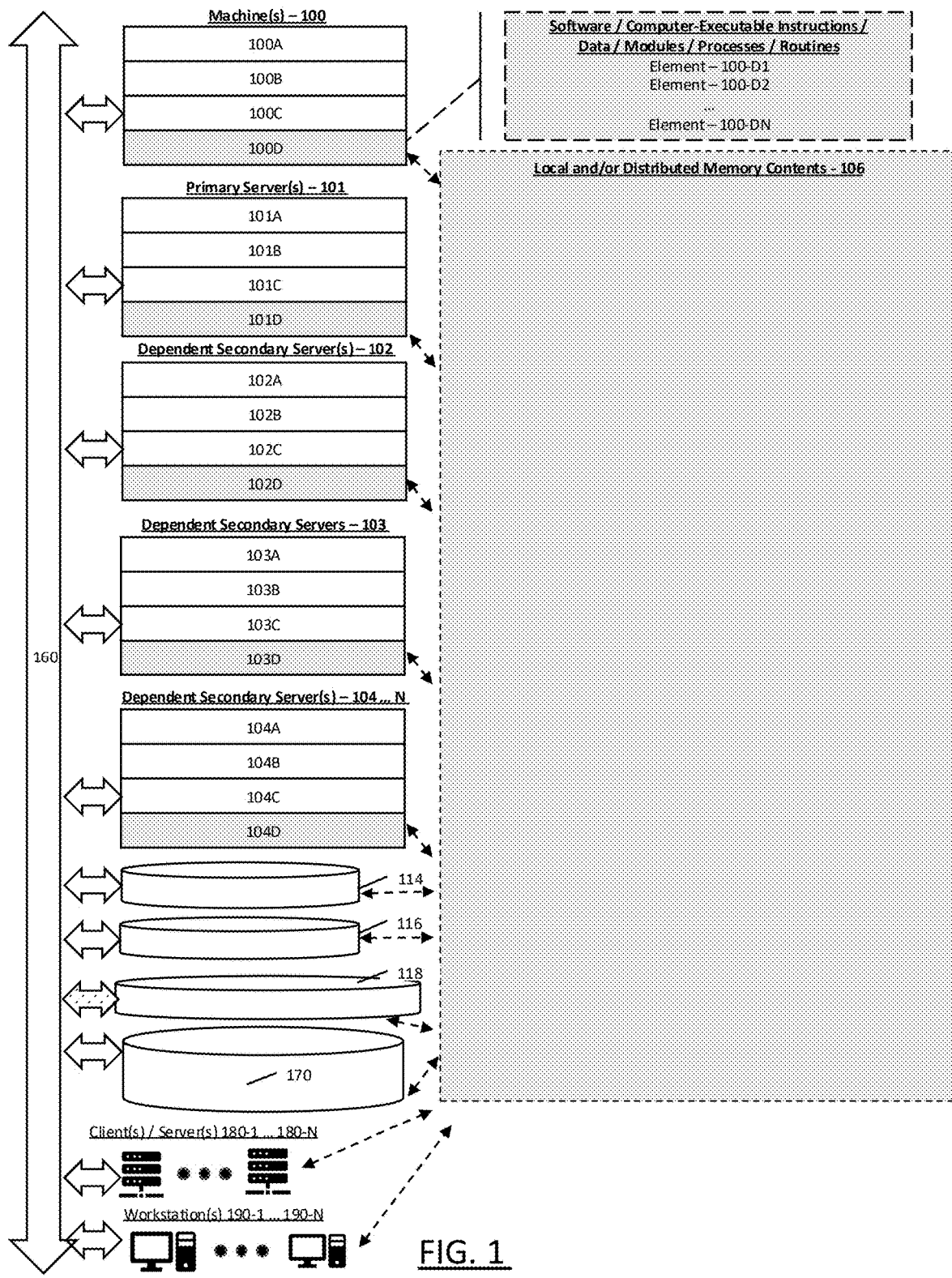
FIG. 1 depicts exemplary operating environment(s) and functionality to implement one or more backend electrical computers and digital processing systems for virtual machine tasks, process management, and task management/control with mutual exclusion mechanisms to extract, transform, and load data from myriad source machines or datastores via distributed fault-tolerant load-balanced computer system architecture to securely synchronize data and store data across multiple processes for presentation to frontend devices.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (e.g., 100, 101, 102, 103, 104, 180-1 . . . 180-N, 190-1 . . . 190-N, etc.) can include one or more general-purpose, customized, configured, special-purpose, virtual, physical, and/or network-accessible devices such as: administrative computers, application servers, clients, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc. (e.g., 100A, 101A, 102A, 103A, 104A, etc.), display(s) and/or input interfaces/devices (e.g., 100B, 101B, 102B, 103B, 104B, etc.), network interfaces, communication buses, or the like (e.g., 100C, 101C, 102C, 103C, 104C, etc.), and memories or the like (e.g., 100D, 101D, 102D, 103D, 104D, etc.), which can include various sectors, locations, structures, or other electrical elements or components, software, computer-executable instructions, data, modules, processes, routines etc. such as generically identified sub-elements 100-D1, 100-D2, 100-D3 . . . 100-DN (similar sub-elements not shown for simplicity purposes for 101D, 102D, 103D, 104D, etc.), although any number of components, modules or the like may be utilized.

Other specific or general components, machines, or the like are not depicted in the interest of brevity and would be understood readily by a person of skill in the art. One or more sample(s) of the foregoing, some of which are expressly depicted, can be seen in FIG. 1 along with one or more sample associated components, subcomponents, related elements, sub-elements, etc.

As used throughout this disclosure, software, computer-executable instructions, data, modules, processes, routines, or the like can include one or more: active-learning, algorithms, alarms, alerts, applications, application program interfaces (APIs), artificial intelligence, approvals, attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning, middleware, modules, namespaces, objects, operating systems, platforms, processes, protocols, programs, rejections, routes, routines, security, scripts, tables, tools, transactions, transformation functionality, user actions, user interface codes, utilities, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the "data to decide juggler status" database 114, "data to allocate namespaces" database 116, "route data to start namespace children" 118, and/or network accessible storage/distributed data/datastores/databases/big data etc. 170.

Sample local and/or distributed memory (or the like) contents in accordance with the foregoing may include, as shown in sample structure 106, software, computer-executable instructions, data, modules, process, routines or the like, such as: Alarm(s)/Alert(s) and Module(s) & Database(s); Analytic Module(s) & Database(s); Application Module(s) & Database(s); Application Program Interfaces and Module(s) & Database(s); Approval(s) and Module(s) & Database(s); Artificial Intelligence Module(s) & Database(s); Browsers and Interfaces Module(s) & Database(s); CRON Table/Event Schedule Module(s) & Database(s); CRON/Namespace/Route/Code Location Module(s) & Database(s); Dashboards/UI/Web Front End Access Module(s) & Databases; Dependent Secondary Server Module(s) & Database(s); Event(s) and Module(s) & Database(s); Event Data and Module(s) & Database(s); Event Type(s) and Module(s) & Database(s); Extraction Module(s) & Database(s) for Backend Machines/Data; Fault Handling Module(s) & Database(s); Generated Event Data and Module(s) & Database(s); Governance Module(s) & Database(s); Interaction(s) and Module(s) & Database(s); IP Address Assignment Module(s) & Database(s); Java Code Location Identifier Module(s) & Database(s); Java Programs and Module(s) & Database(s); Java Program Excepts and Module(s) & Databases; Java Virtual Machines and Module(s) & Database(s); Juggler Schedule and Supervisor Module(s) & Database(s); Load Module(s) & Database(s) for Front End Devices; Load Balancing Module(s) & Database(s); Logging and Log(s) and Module(s) & Database(s); Machine Learning Module(s) & Database(s); OS/Networking Component(s) and Module(s); Primary Server Module(s) & Database(s); Permissions and Security Module(s) & Database(s); Namespaces and Module(s) & Database(s); Raw Data and Module(s) & Database(s); Request(s) and Module(s) & Database(s); Response(s) and Module(s) & Database(s); Routes and Routing Module(s) & Database(s); Scheduler Module(s) & Database(s); Security Module(s) & Database(s); Server Election Module(s) & Database(s); Server Table and IP Address Module(s) & Database(s); Structured or Unstructured Data; Transform Module(s) & Database(s); UI/Command Line Interface-Load Module(s) & Database(s); User Interface(s) and Module(s) & Database(s); User Action(s) and Module(s) & Database(s); Web Pages and Module(s) & Database(s), etc.

The foregoing software, computer-executable instructions, data, modules, processes, routines, or the like, when executed-individually and/or collectively across-one or more various computers, machines, or the like (or any components therein) may cause ASICs, processor(s), core(s), executor(s), etc. to perform one or more functions relevant to, or that may be used in, one or more aspects of this disclosure.

As used throughout this disclosure, computer "networks," topologies, or the like (e.g., 160, etc.) can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based protocol. One or more sample(s) of the foregoing, some of which are expressly depicted, can be seen in FIG. 1 along with their associated components, subcomponents, related elements, sub-elements, etc.

Accordingly, and as described briefly above, a skilled artisan will understand that FIG. 1 depicts exemplary operating environment(s) and functionality for one or more backend electrical computers and digital processing systems for virtual machine tasks, process management, and task management/control with mutual exclusion mechanisms to extract, transform, and load data from myriad source machines or datastores via distributed fault-tolerant load-balanced computer system architecture to securely synchronize data and store data across multiple processes for presentation to frontend devices in one or more aspects of this disclosure.

Figure 2A:
FIGS. 2A-B are sample server and IP address tables that can be utilized in conjunction with one or more ETL or other aspects of this disclosure.
Figure 3:
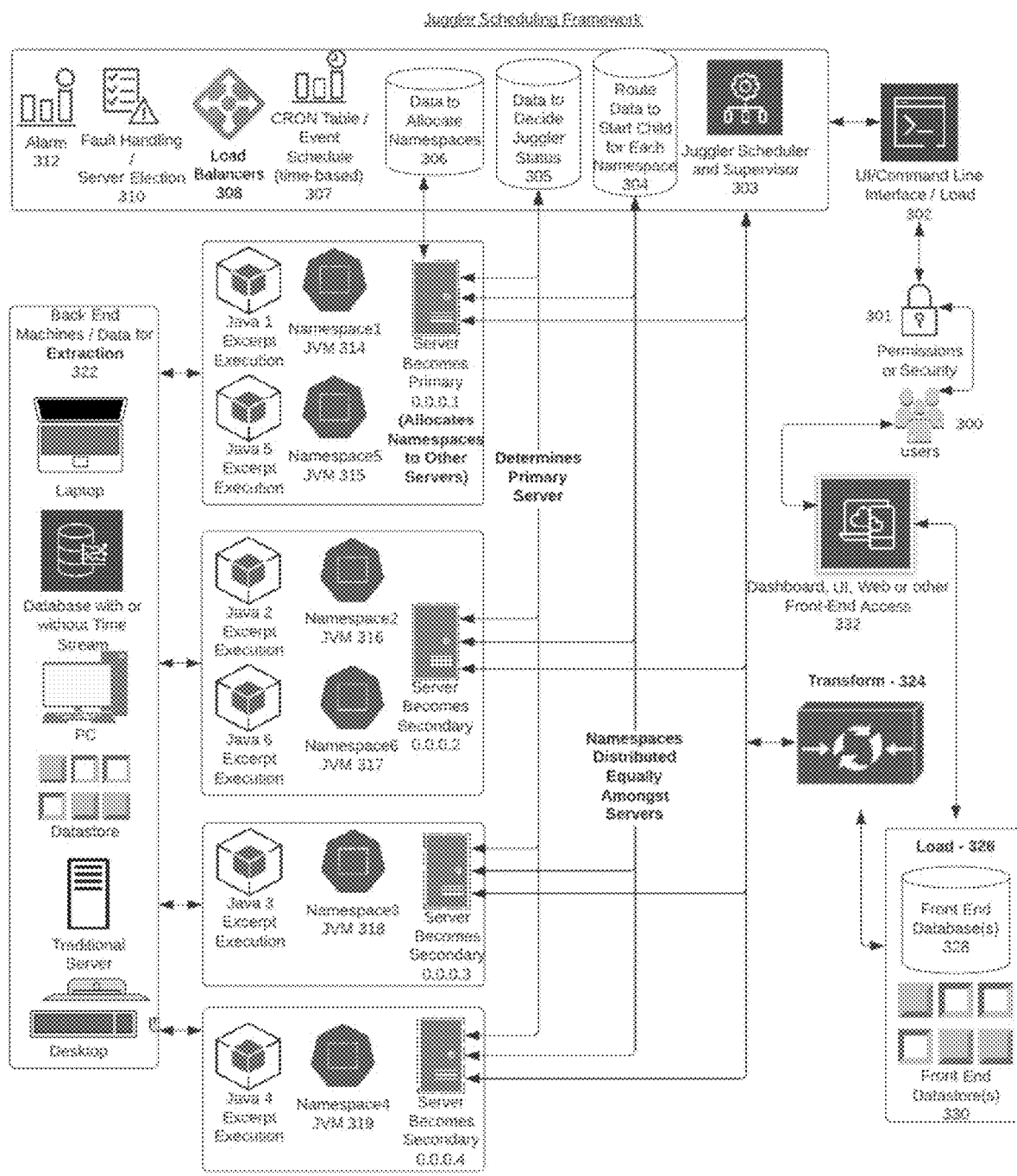
FIG. 3 is a sample functional block/flow diagram illustrating an exemplary juggler scheduling framework and functional description that can be utilized to implement one or more ETL or other aspects of this disclosure.

By way of non-limiting reference and explanation, FIG. 2A is a sample server and IP address table 200 that can be utilized in conjunction with one or more ETL or other aspects of this disclosure. The server table 200 can keep track of all available and/or in-use servers, whether each server is designated as the primary server 101 or one of the secondary (tertiary or other) servers 102, 103, 104, etc. Each server's IP address 206 can also be tracked in the server and IP address table 200, which can be stored in oracle or the like, and can be in any network-accessible location or located with the juggler scheduler/supervisor 303 as illustrated in FIG. 3.

Figure 2B:

Similarly, FIG. 2B is another sample server and IP address table 207 that can be used in conjunction with one or more ETL or other aspects of this disclosure. As can be seen, various fields can be included with the server and IP address table as desired. In this example, the table 207 contains fields for a server ID 208, an IP address 210, a server name 212, an indication of whether the server is a primary or Mom server with controlling functionality and responsibilities 214 or one or more other secondary servers, a server order 216, and an identification of the datacenter in which the server is located 218. One or more of these or other fields can be used as desired.

By way of non-limiting reference and explanation, FIG. 2C is a sample routing table 250 that can be utilized in conjunction with one or more ETL or other aspects of this disclosure. The routing table 250 can include one or more fields relevant to ETL aspects of this disclosure such as, for example, a CRON daemon field 242, which is a built-in Linux (or other similar OS) utility that runs processes on the system at scheduled time intervals. As illustrated in field 252, the format of the field corresponds to the number of minutes past the hour on which the process should run, a separator (i.e., "plus" sign), the number of minutes, the number of seconds, and so on. Any desired formatting for the CRON field can be used. Minutes, hours, days, months, days of the week, etc. can be specified in the CRON

FIELD OF THE DISCLOSURE

Other fields in the routing table 250 can specify the namespace 254 (i.e., NS1, NS2, NS3, NS4, NS5, NS6, etc.) to be used, a route name 256 for the name of the Java job to execute, and the location of the code 258 that is to be executed for the Java job. The field 258 for the location of the code can specify a disk location (e.g., a path), a Jar File (which stores the java code or excerpts thereof to be executed), and the applicable classes and methods for the Java job. This simplified and optimized routing table 250 minimizes the information that must be provided to the juggler scheduler/supervisor 303 for the Java jobs to execute in the appropriate namespaces with the appropriate variables at the appropriate time intervals.

Similarly, FIG. 2D is an alternative sample routing table 270 that can be used in conjunction with one or more ETL or aspects of this disclosure. As can be seen, various fields can be included with a routing table as desired for identification, scheduling, and execution of jobs or routes. In this example, the table 270 will again preferably include a CRON field a/k/a quartz or timing information 272, a timer 274 for the CRON field that can be used to wait until it is time to execute the route (see FIG. 5B for an example), a JarName field 276 to identify the name of the file containing the Java code, a ClassPath field 278 designating the path, a MethodName field 280 identifying the name of the method, a parameters field 282 setting forth the applicable parameters for the route, a RouteName 284, a directory 286 for the target code, and a designated namespace 288. Again, one or more of these or other fields can be used as desired.

FIG. 3 is a sample functional block/flow diagram illustrating an exemplary juggler scheduling framework and functional description that can be utilized to implement one or more ETL or other aspects of this disclosure.

One or more users 300 may provide login or other permissions or security information 301 to access the ability to enter Java jobs to be juggled (i.e., scheduled and handled in parallel in accordance with various aspects of this disclosure). Once authorized, the users 300 may be presented with a user interface or command line option 302 to load their particular jobs into the juggler schedule and supervisor 303 (i.e., "juggler" for short).

For example, the syntax for a job could be the row data show in FIG. 2B. The first job could have a CRON setting of 0+0/5+* (252), use a shared namespace (i.e., NS1) (254), have a route name or job name (e.g., Route1) (256), and path information to a file that contains the code to be executed (258). Similarly, the second job could have a CRON setting of 5+0/5+*, the same shared namespace (i.e., NS1) (254) have a different route name (or job name) (e.g., Route2) (256), and different path information to a different file that contains the code to be executed (258). Other jobs such as Route3 and Route4 may share the same namespace (i.e., NS2), and still other jobs such as Route5, Route6, and Route7 may require their own namespaces (i.e., NS3, NS4, NS5), and so on. This simplified format and minimal information makes job submission uniform, reliable, and easy for authorized users to submit jobs for execution by the scheduling and supervisor application.

Juggler 303 is the overall application in charge of implementing the ETL functionality of this disclosure to schedule and execute Java jobs. Juggler 303 can contain or access a CRON table/event schedule that is time-based 307 such as show in FIG. 2B. Juggler 303 can balance the load on each server 101, 102, 103, 104, etc. using a load balancer 308 or related functionality based on resource needs, speed optimization, timing requirements, load requirements, resource availability, etc. Juggler 303 is also responsible for initial election of the primary server and subsequent reassignment of the primary server to another machine in the event of a server fault or required server maintenance through use of a fault handling/server election utility 310. When necessary, Juggler 303 can also generate alarms or alerts 312 for faults, system messages, system reports, or the like as appropriate.

For each Java job to be handled by Juggler 303, the application can utilize data to decide a juggler status (i.e., which server should be designated the primary and the others that should be implemented as secondaries) 305 and can setup the server table 200 with this information and with the IP address for each server. The data 305 may reside locally with the juggler application 303 or may be store in a network accessible location such as database 114. Juggler 303 may also provide data necessary to allocate namespaces 306 to the primary server 0.0.0.1, which allocates namespaces to itself 101 and all other servers 102, 103, 104, etc. Namespaces can be distributed equally based on load balancing 308 or other criteria.

For each Java job to be handled by Juggler 303, the application can also provide the necessary route data to start each necessary child for each namespace 304 and can communicate that information to the primary and secondary servers. As indicated in FIG. 2B, the route data would include the information contained in the routing table 250 such that each namespace will know the routes assigned to it as well as the disk location and JAR file containing the Java code to be executed along with corresponding classes and methods.

In one or more aspects of this disclosure, each namespace may be its own Java Virtual Machine (JVM) and each server may run one or more JVMs. For example, in FIG. 3, the primary server 101 is running Namespace1 and Namespace5, which are JVMs 314 and 315; secondary server 102 is running Namespace2 and Namespace6, which are JVMs 316 and 317; secondary server 103 is running Namespace3, which is JVM 318; and secondary server 104 is running Namespace4, which is JVM 319. Again, the mapping of JVMs/namespaces to servers can be specified in the routing table 250.

In each namespace, the JVM will execute the java code excerpts identified by the corresponding code location field 258 in routing table 250. Stated differently, the JVM will look up the path, JAR file containing the Java code, and the Classes and Methods associated therewith. Each Java code excerpt can then be executed in accordance with the CRON timing specified in the routing table 250 in order to perform the backend extraction of data 322 from any number of individual sources such as laptops, databases, PCs, datastores, databases, servers, desktops, workstations or any other backend components that are network accessible. Hundreds of thousands of such backend devices and/or sources contained thereon can be accessed and data can be extracted therefrom based on the small Java code excerpt contained in the JAR file for each namespace/JVM.

After extraction 322, the primary and secondary servers 101-104 can provide the extracted data for transformation, which can clean, sanitize, scrub, put into a uniform format, etc. such that it is suitable to load 326 into frontend databases, datastores, machines, etc. After loading 326, the extracted and transformed data is then available for access via dashboards, user interfaces, web pages, or other frontend access means 332 by users 300. This optimized job submission framework allows parallel processing of jobs (i.e., small Java code excerpts) in a distributed fault-tolerant fashion with minimal effort by users. In the event of a fault, the small excerpt may be restarted. The jobs do not need to have entire Java files and can be limited to only a few lines of code as necessary. Complete execution of complete Java files is neither required nor desired. This increases the speed of job processing and reduces the resources required to execute the jobs and perform the required functions.

In essence, a person of skill in the art will understand that, in this disclosure, Juggler 303 is operating as a scheduling framework that is written in Java and works on any computer that runs Java. It is system independent. It schedules, using industry standard CRON, and runs hundreds of individual small programs written in Java. The individual programs (target code a/k/a code excerpts) do not need any special code or interface for Juggler. The target code is pure Java with standard parameter interfaces. Any Java code can be used as a target. The JAR files with the target code can be located anywhere on a machine. Any method, in any class, in any JAR file can be run from Juggler.

As illustrated in FIG. 2B, routes consist of a schedule, the information of where the target code is and parameters to pass to the target program. As shown in FIGS. 2C and 3, routes are bundled together into a namespace, which is also a JVM. Juggler can be run on multiple machines (computers) and the namespaces can be distributed across the different computers, preferably to optimize speed, reduce resource requirements, and/or balance loads.

If any machine 101, 102, 103, 104 fails, Juggler will automatically move the namespaces being executed to another working machine. Juggler handles individual JVM failures and can be made to run on only certain machines or data centers. The number of processes can be balanced between the current working computers 101, 102, 103, 104. The data for running each route are on tables 250 in a database. Logging and security are consistent and handled by Juggler.

A REST command system can be used to get reports and control the starting/stopping of Routes or JVMs on any of the ETL servers.

Figure 4:
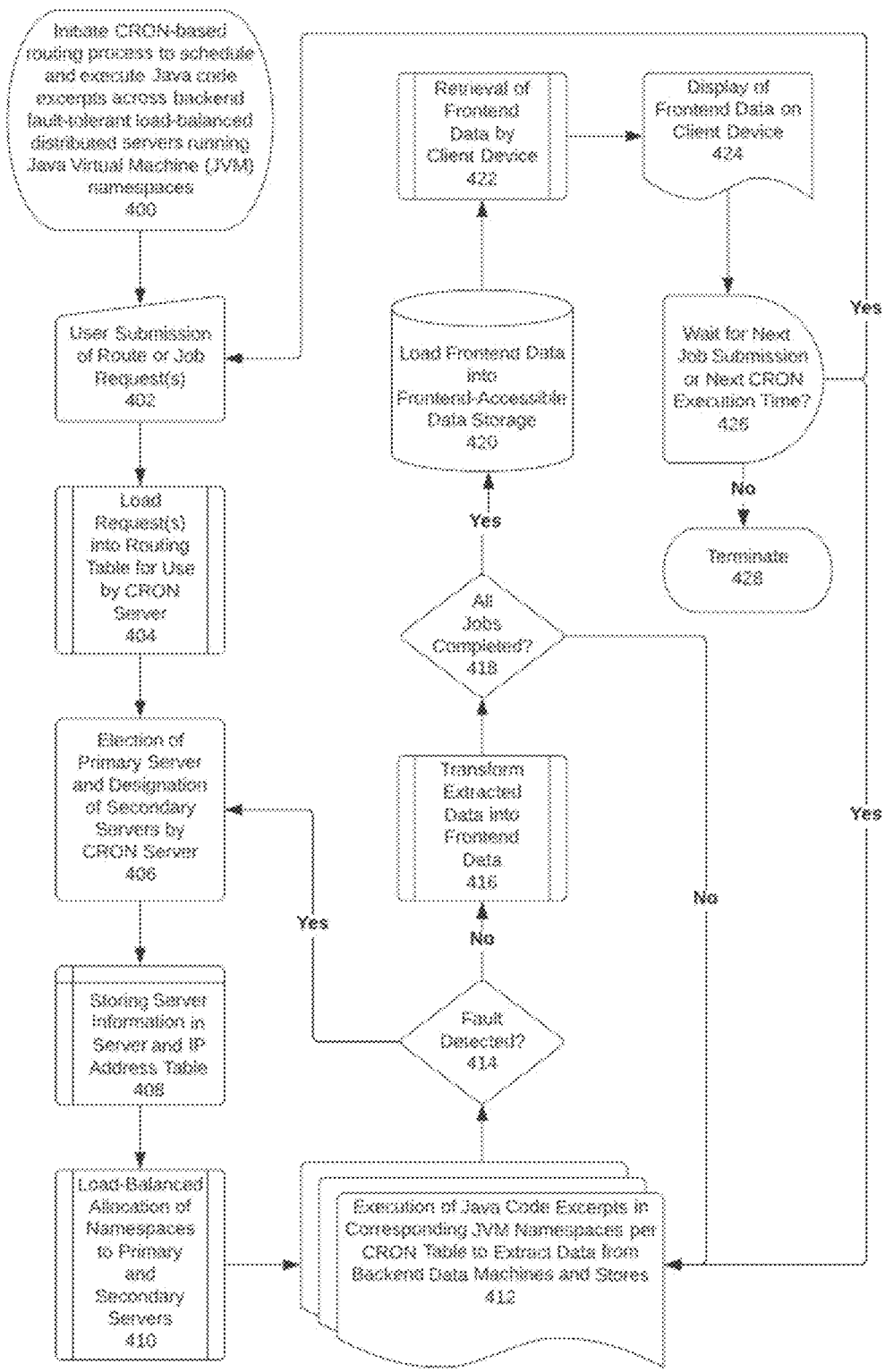
FIG. 4 is a sample process flow for exemplary juggler scheduling and execution that can be utilized to implement one or more ETL or other aspects of this disclosure.

FIG. 4 is a sample process flow for exemplary juggler scheduling and execution that can be utilized to implement one or more ETL or other aspects of this disclosure.

In step 400, a CRON-based routing process to schedule and execute Java code excerpts across backend fault-tolerant load-balanced distributed servers running Java Virtual Machine (JVM) namespaces is initiated. A user may submit one or more route(s) or job request(s) in 402. The requests are loaded into a routing table for use by a CRON server or the like in 404.

A primary server is elected and secondary servers are designated by the CRON server in 406. The applicable server information is stored in the server and IP address table in 408.

Namespaces are allocated to the primary and secondary servers 210 as desired, preferably in a load-balanced fashion in 410. Load-balancing can be accomplished by dividing the computational requirements amongst the available resources and distributing them in an even fashion or based on the processing capabilities of differing servers.

At the applicable time specified by the CRON field, Java code excerpts or snippets in the corresponding JVM namespaces may be executed in order to perform extraction from backend machines or sources of data in 412.

If a fault is detected in 414, another election or redesignation of servers can be performed in 406 and the process can be repeated in whole or as in part as appropriate.

As long as a fault is not detected, the extracted data can be transformed in 416 into the desired frontend data. This process can be performed in parallel with other processes in the routing table based on their timing requirements and can continue until the next applicable CRON interval or all jobs are completed 418.

The transformed frontend data can be loaded into frontend-accessible data storage in 420. Any type of data storage means or any type of machine(s) may be used to store the frontend data. The data may be stored redundantly, on a single machine, or in a distributed fashion as desired, preferably in a manner in order to provide fast access by client devices as needed.

A client device can retrieve whatever frontend data is desired for review, analysis, or processing in 422 and can be displayed in 424. Any type of monitoring hardware can be used to display the frontend data and it can be graphically represented in a dashboard, as text data, in a graphical user interface, etc. Subsequent jobs may be submitted at any time and added to the tables 426.

Figures 5A, 5B:
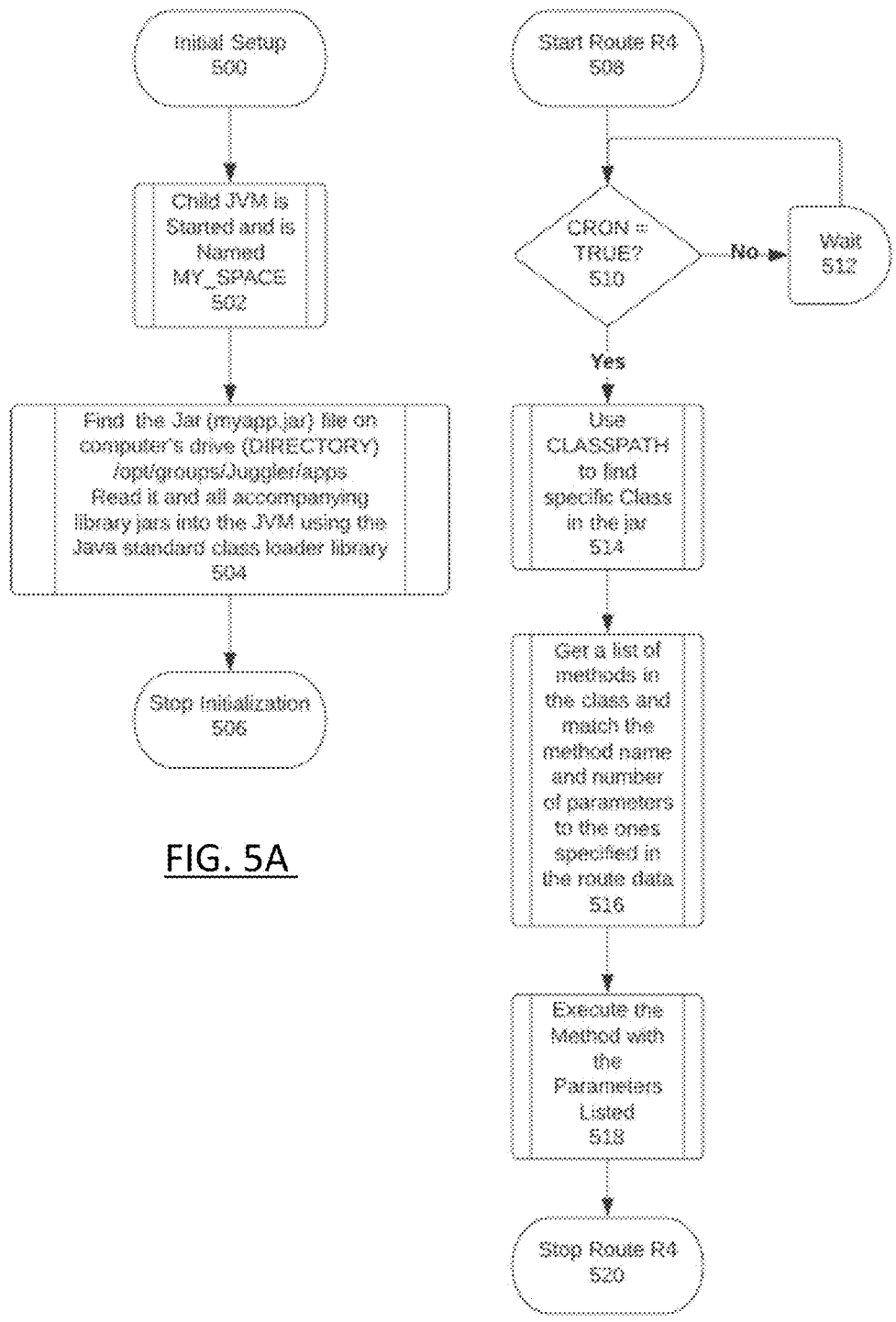
FIGS. 5A-B are sample process flows for running target code using the route table data of FIG. 2 (as an example) that can be utilized to implement one or more ETL or other aspects of this disclosure.

FIGS. 5A-B are sample process flows for running target code using the route table data of FIG. 2 (as an example) that can be utilized to implement one or more ETL or other aspects of this disclosure.

In 500, an initial setup is performed. A child JVM namespace is started and named such as, for example, MY_SPACE in 502. Subsequently, in 504, the applicable Jar file (e.g., myapp.jar) is located in local or other memory accessible via a network. It is read and all accompanying library jars are loaded into the JVM using the standard Java class loader library. After this, the initialization of the route is complete 506.

In 508, the route is started. In the case of the route table of FIG. 2D, the route name is R4 and it is initiated. If the CRON field is true (i.e, if it is time to execute the route) 510, then route execution commences 514. Otherwise, the process will wait 512 until the execution time arrives. During commencement, the ClassPath is used to find the specific Class in the jar in 514. In 516, a list of methods in the class is retrieved and the method name and number of parameters to the ones specified in the route data is matched. The method with the parameters listed is then executed in 518. After completion, the route (e.g., R4) is stopped.

Figure 6:
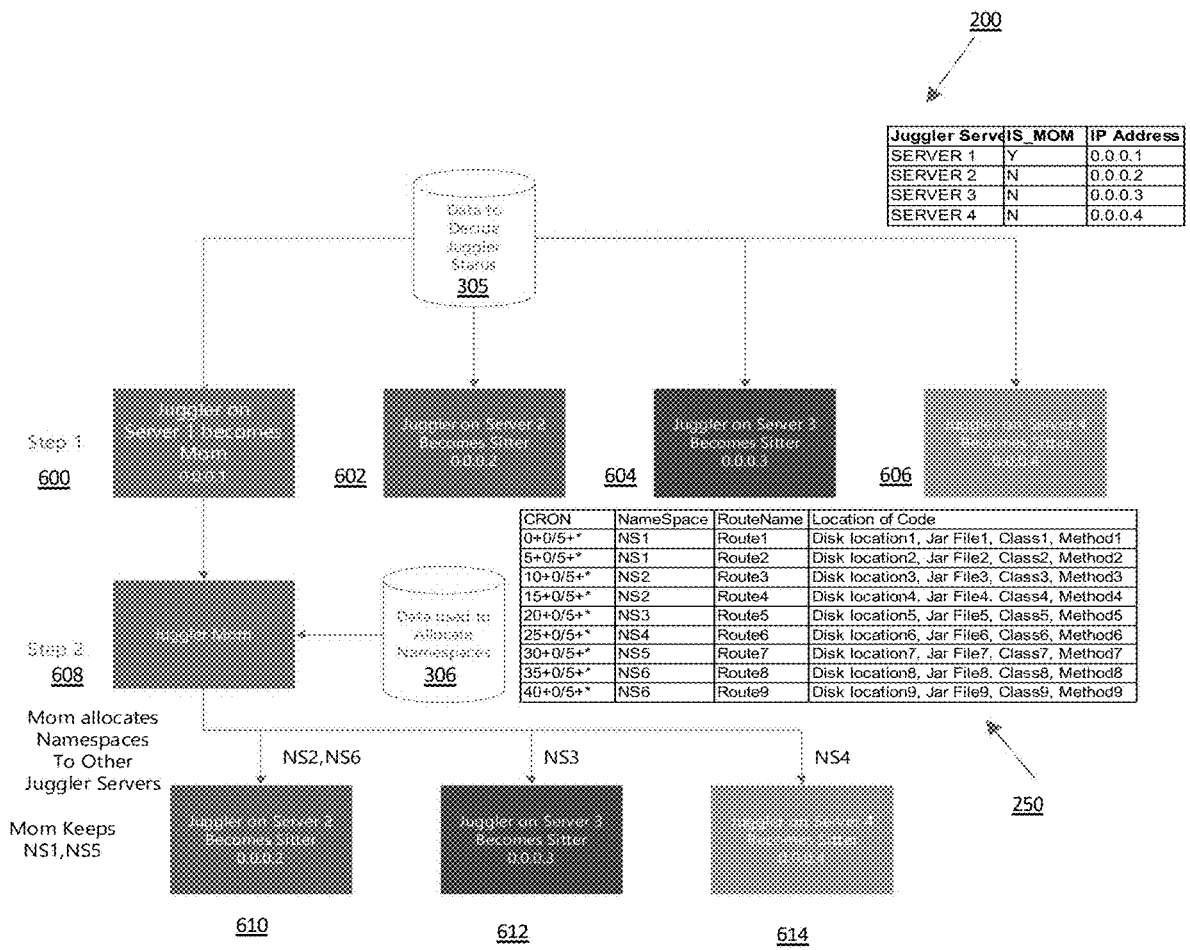
FIG. 6 is a sample juggler architecture that can be utilized to implement one or more ETL or other aspects of this disclosure.

FIG. 6 is a sample juggler architecture that can be utilized to implement one or more ETL or other aspects of this disclosure. In this example, the server and IP address table 200 and the routing table 250 are used for explanation purposes.

Data to decide the juggler status 305 is used in step 1 to designate server 1 as the primary (or Mom) server (600) and servers 2, 3, and 4 are designated as secondary servers (or sitters by virtue of a parent-child-babysitter analogy) as in 602, 604, and 606.

Data used to allocate namespaces 306 is used in step 2 by the juggler mom (or primary server) to allocate namespaces to the sitters (or secondary servers). In this example based on the server and IP address table 200 as well as routing table 250, the mom (i.e., server 1) keeps namespaces NS1 and NS5 (608), allocates NS2 and NS6 to server 2 (610), allocates NS3 to server 3 (612), and allocates NS4 to server 4 (614).

Figure 7:
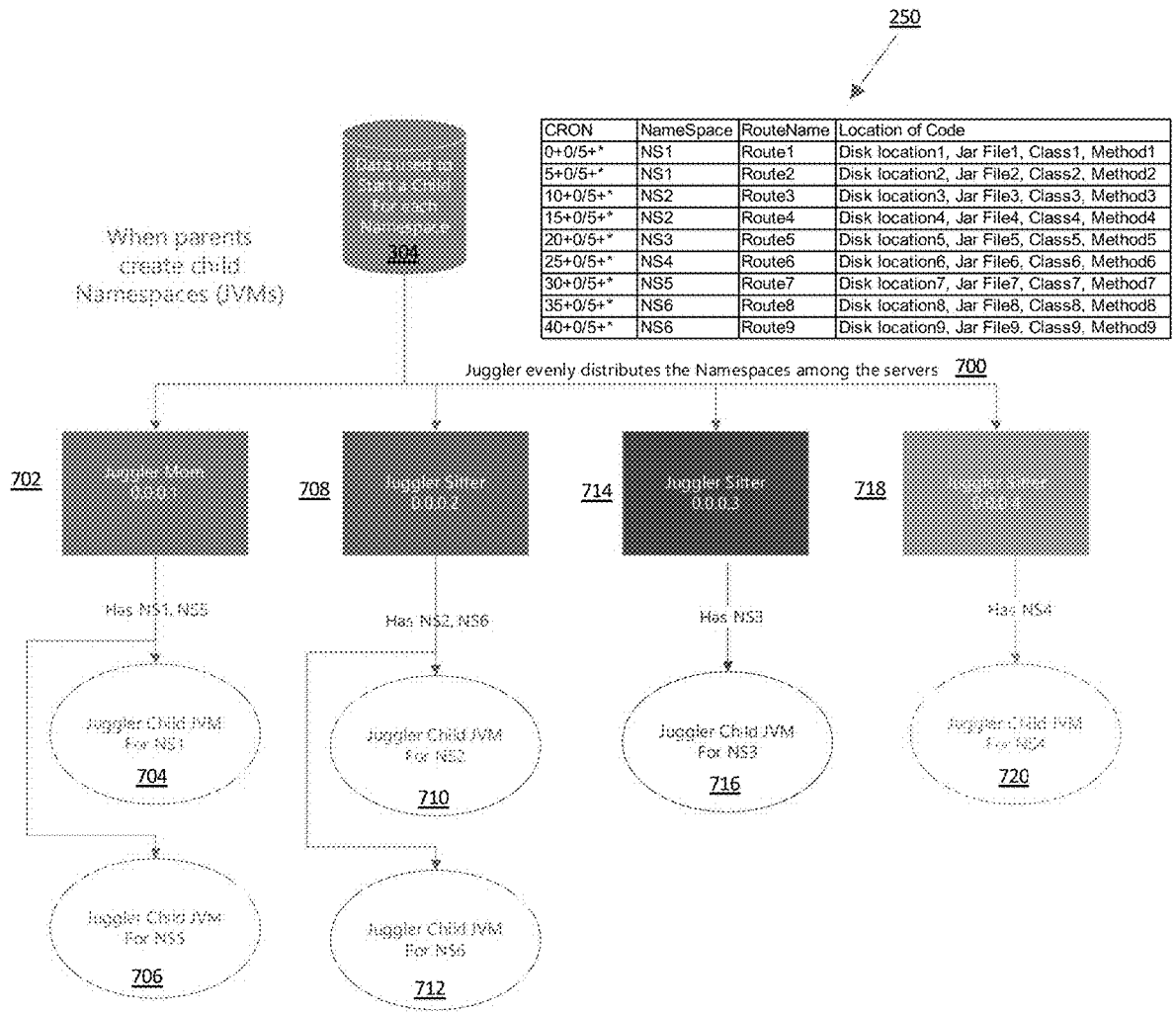
FIG. 7 is a sample functional block/flow diagram illustrating parent creation of child namespaces that can be utilized to implement one or more ETL or other aspects of this disclosure.

FIG. 7 is a sample functional block/flow diagram illustrating parent creation of child namespaces that can be utilized to implement one or more ETL or other aspects of this disclosure. Again this example is described in reference to sample route table 250.

When parent(s) create child namespaces (JVMs), the applicable data 304 is used to start a child for each namespace. The juggler distributes the namespaces amongst the servers in 700 as described previously or in whatever other manner is desired for dividing processing. The first server is designated as the juggler mom in 702 and it has child namespaces/JVMs NS1 (704) and NS5 (706). The second server is designated as a juggler sitter (708) and has child namespaces/JVMs NS2 (710) and NS6 (712). The third and fourth servers are also designated as juggler sitters 714 and 718, and respectively are allocated NS3 (716) and NS4 (720).

Figure 8:
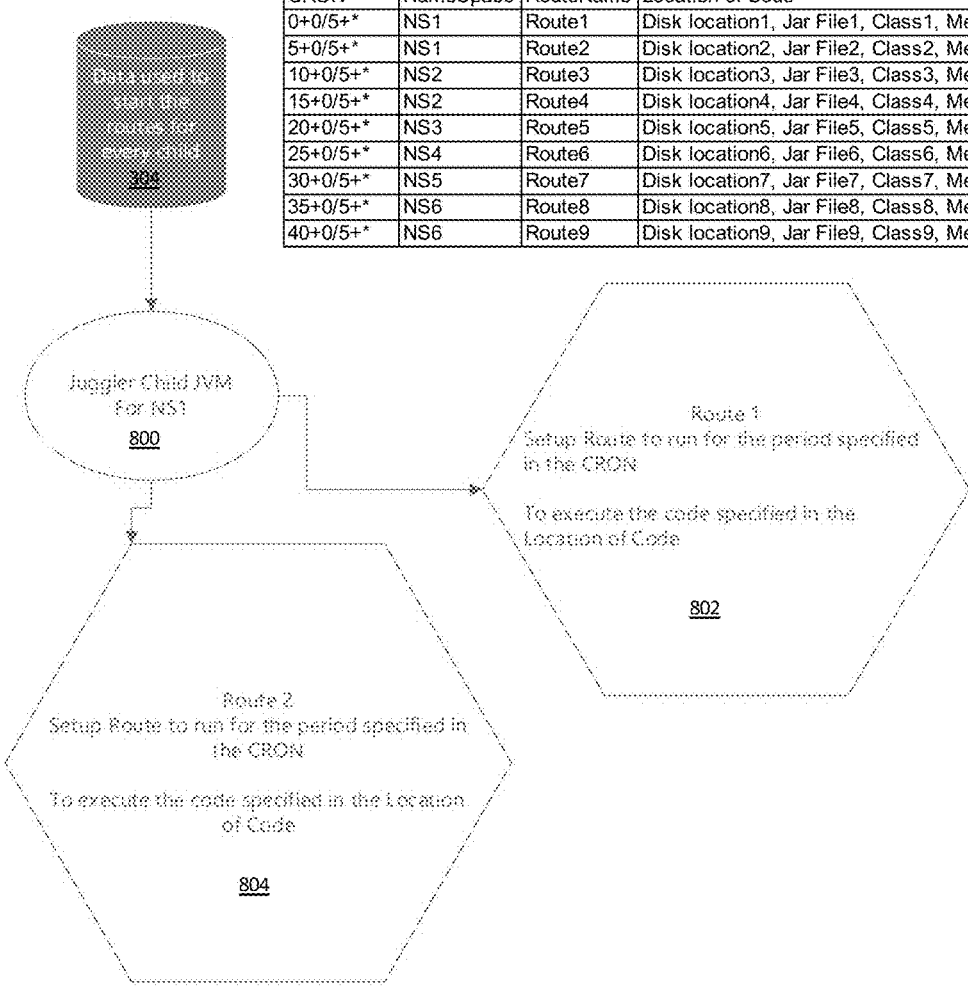
FIG. 8 is a sample functional block/flow diagram illustrating how active routes can be started in implementation of one or more ETL or other aspects of this disclosure.

FIG. 8 is a sample functional block/flow diagram illustrating how active routes can be started in implementation of one or more ETL or other aspects of this disclosure. This example also uses route table 250 for explanation purposes.

In general, every child juggler (or secondary server) starts all of the active routes assigned to it within each JVM namespace using its respective data 304. For example, the juggler child JVM for NS1 (800) starts Route 1 by setting up the route to run for the period specified in the CRON to execute the code specified in the location of code in 802.

Similarly, Route 2, which is also assigned in the same namespace NS1, is started by the juggler child for NS1 (800) by starting Route 2 by setting up the route to run for the period specified in the CRON to execute the code specified in the location of code in 804.

Figure 9:
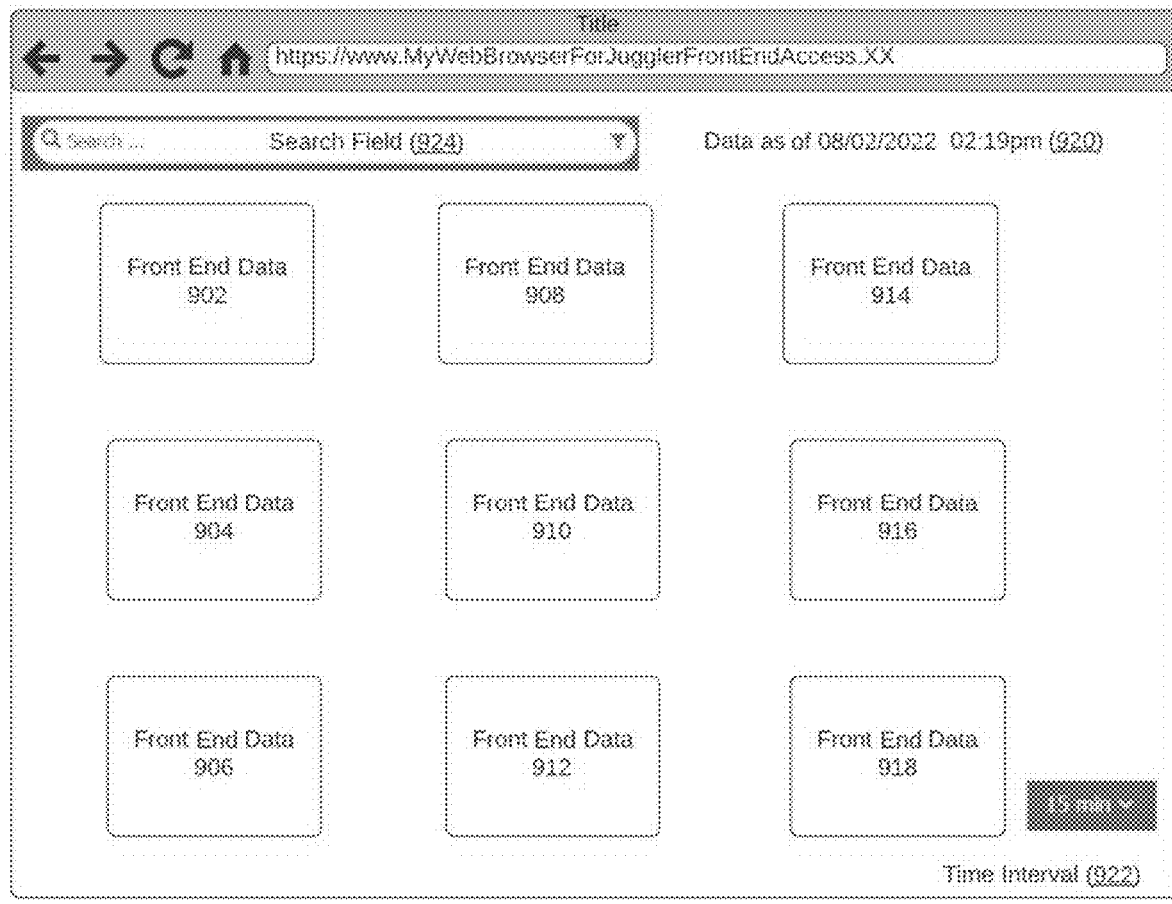
FIG. 9 is a sample frontend interface that can be used in conjunction with one or more ETL or other aspects of this disclosure to provide frontend access as needed by clients.

FIG. 9 is a sample frontend interface that can be used in conjunction with one or more ETL or other aspects of this disclosure to provide frontend access as needed by clients. Any type of frontend client may be used to access the fronend data and the frontend data 902-918 may be displayed in a web page like shown in FIG. 9, a dashboard, or any other format as desired. Text may also be provided to identify a timestamp representing the last time/date at which the displayed data is valid in 920. The displayed data may be for various time intervals such as 15 minutes, 30 minutes, hourly, daily, etc. and may be selected via a dropdown box 922 if desired. Search functionality may also be provided to locate the desired frontend data in 924.

A sample Java code excerpt/snippet for execution by JVM namespaces of the type that could be used in conjunction with one or more ETL or other aspects of this disclosure is shown in the appendix. Again, only excerpts or snippets of code need to be executed by each JVM namespace. Entire programs do not need to be executed. Only the desired classes and methods need to be loaded and run.

Stated differently, an entire (or complete) Java program is not loaded and executed in various aspects of this disclosure. Rather, only the import files referenced in the Jar need to be loaded and only the corresponding methods and classes contained in the Jar file are executed in each route in each JVM namespace.

A sample Java route startup with CRON that could be used in conjunction with one or more aspects of this disclosure is also shown in the appendix. This type of routine may be used to setup particular routes in the routing tables.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

APPENDIX

Sample Java Code Excerpt/Snippet for Execution by JVM
(Part A)

```
package com.bac.mycto.juggler.events;
import java.io.File;
import java.io.FilenameFilter;
import java.lang.reflect.Method;
import java.lang.reflect.Type;
import java.net.MalformedURLException;
import java.net.URL;
import java.net.URLClassLoader;
import java.util.ArrayList;
import java.util.Collections;
import java.util.HashMap;
import java.util.List;
import java.util.Set;
import org.joda.time.DateTime;
import com.fasterxml.jackson.core.type.TypeReference;
import com.fasterxml.jackson.databind.ObjectMapper;
public class ReflectionDemo {
   private static HashMap<String, ClassLoader> classLoaderMap = new HashMap<String, ClassLoader>( );
   public final static String DISPLAYTIMEZONE = "America/New_York";
   // this can be executed a method in any class
   public void executeReflection(String jarName, String classPath, String methodName, String parameters,
         String directory, String processName2, String id, String routeName) {
      // create a file filter for jar files
      FilenameFilter filter = new FilenameFilter( ) {
         @Override
         public boolean accept(File dir, String name) {
            if (name.lastIndexOf('.') > 0) {
               // get last index for '.' char
               int lastIndex = name.lastIndexOf('.');
               // get extension
               String str = name.substring(lastIndex);
               // match path name extension
               if (str.equals(".jar")) {
                  return true;
               }
            }
            return false;
         }
      };
      int numParams = 0;
      // parameters exist or they don't, if they do, they they are either a
      // number or a string
      HashMap<String, String> parameterMap = new HashMap< >( );
      List<String> parmNames = new ArrayList<String>( );
      if (!parameters.isEmpty( )) {
         // reflection section to execute the method
```

Sample Java Code Excerpt/Snippet for Execution by JVM
(Part B)

```
      ObjectMapper mapper = new ObjectMapper( );
      parameterMap = mapper.readValue(parameters, new TypeReference<HashMap<String,
String>>( ) {
      });
      numParams = parameterMap.size( );
      numParams = parameterMap.size( );
      // need to get the parameter names in order
      Set<String> parmKeys = parameterMap.keySet( );
      parmKeys.forEach(key -> {
         parmNames.add(key);
      });
      // sort the names because there is a chance they are not ordered
      Collections.sort(parmNames);
   }
   // section for using reflection to execute the method of the class
   // create instance of "Class"
   // if the directory has already been loaded and has a ClassLoader in the map
   // then just use the one already saved, if not create on from the directory
   ClassLoader loader = classLoaderMap.get(directory);
   if (loader == null) // create a new classloader for this class
   {
      loader = getClassLoader(directory, filter);
```

```
    classLoaderMap.put(directory, loader); // save the new classloader
}
// the main JVM ClassLoader
Class<?> runClass = null;
runClass = loader.loadClass(classPath);
runClass.newinstance( );
Method genericMethod = null;
Method[ ] methods = runClass.getMethods( ); // get all the methods in this class and superclasses
// find the method that matches the parameters and the name
boolean found = false;
for (Method method : methods) {
    // make sure the name and the number of parameters are the same
    if (method.getName( ).trim( ).equals(methodName.trim( )) &&
method.getParameterTypes( ).length == numParams) {
        genericMethod = method;
        found = true;
        break;
    }
    if (method.getParameterTypes( ).length == 0) {
        continue;
    }
    // 1 Map parameter
    if (method.getParameterTypes( )[0].toString( ).equals("interface.java.util.Map")
        && method.getName( ).trim( ).equals(methodName.trim( ))) {
        genericMethod = method;
        found = true;
        numParams = 1;
```

Sample Java Code Excerpt/Snippet for Execution by JVM
(Part C)

```
        break;
    }
}
if (found == false) {
    return;
}
// create the parmeters needed for the call to the method
if (numParams > 0) {
    Type[ ] parmTypes = genericMethod.getParameterTypes( );
    Object[ ] args = new Object[numParams];
    // passing a map as a parameter
    if (parmTypes[0].toString[ ].equals("interface java.util.Map") && numParams = = 1) {
        args[0] = parameterMap;
    } else {
        for (int i = 0; i < numParams; i++) {
            String param = parmNames.get(i);
            Type parmType = parmTypes[i];
            String parmName = parmType.toString( );
            String strParm = parameterMap.get(param);
            switch (parmName) {
            case "class org.joda.time.DateTime";
                if (strParm.equals("CURRENTDATE')) // insert the current
date when this is in the parameterlist
                {
                    args[i] = new DateTime( );
                    break;
                }
            case "class java.lang.String";
                String str = parameterMap.get(param);
                String date = testDate(str);
                if (date != null) {
                    args[i] = date; // the parameter was a date format
string, got real date
                } else {
                    args[i] = str;
                }
                break;
            case "class java.lang.Integer";
            case "int";
                args[i] = Integer.parseInt(strParm);
                break;
            case "class java.lang.Long";
            case "long";
                Long millis = testMillis(strParm); // is this a millis indicator
                if (millis != null) {
```

```
            args[i] = millis; // the parameter was a millisecond
formated string, got real date in millis
        } else {
```

Sample Route Startup with CRON

```
public void setRoute(RouteBuilder rbo, RouteDefinitionDAO route) {
  String routeName = route.getRouteName( );
  ReportRecord rr = SystemProps.getRouteMap(routeName);
  if (rr = = null) // add a new Route Report Record
  {
    rr = new ReportRecord( );
    rr.setRouteName(routeName);
    rr.setRouteStarted(new DateTime( ));
    rr.setNbkId(route.getNBK( ));
    rr.setParameters(route.getParameters( ));
    rr.setNameSpace(route.getNameSpace( ));
    rr.setAcitve(route.getActive( ));
    SystemProps.setRouteMap(routeName, rr);
  }
  String from = null;
  if (route.getTimer( ) != 0) {
    from = "timer://poll?period=" + route.getTimer( ) + "&repeatCount=0";
  } else if (route.getQuartz( ) != null && !route.getQuartz( ).trim( ).equals("")) {
    from = "quartz2://" + route.getRouteName( ) + "?" + route.getQuartz( );
    from = from.replaceAll("[\r\n]", ""); // junk gets into the fields and needs to be removed
  }
  String parameters = route.getParameters( );
  if (parameters == null) {
    parameters = "";
  }
  if (from == null) // setup the route, but don't start it
  {
    rbo.from(from).noAutoStartup( ).threads(1).routeId(routeName).setProperty("JarName",
rbo.constant(route.getJarName( )))
        .setProperty("ClassPath",
rbo.constant(route.getClassPath( ))).setProperty("MethodName", rbo.constant(route.getMethodName( )))
        .setProperty("Directory",
rbo.constant(route.getDirectory( ))).setProperty("JVMName", rbo.constant(route.getNameSpace( ).toString( )))
        .setProperty("Parameters", rbo.constant(parameters))
        // .setProperty("Server",rbo.constant(route.getServer( )))
        .setProperty("LastUpdateDate",
rbo.constant(route.getLastUpdate( ))).setProperty("RouteName", rbo.constant(routeName))
        .process(new ExecuteReflection( ));
    rr.setRouteStarted(new DateTime( ));
  } else {
    rbo.from(from).threads(1).routeId(routeName).setProperty("JarName",
rbo.constant(route.getJarName( )))
        .setProperty("ClassPath",
rbo.constant(route.getClassPath( ))).setProperty("MethodName", rbo.constant(route.getMethodName( )))
        .setProperty("Directory",
rbo.constant(route.getDirectory( ))).setProperty("JVMName", rbo.constant(route.getNameSpace( ).toString( )))
        .setProperty{"Parameters", rbo.constant(parameters))
        // .setProperty("Server",rbo.constant(route.getServer( )))
        .setProperty("LastUpdateDate",
rbo.constant(route.getLastUpdate( ))).setProperty("RouteName", rbo.constant(routeName))
        .process(new ExecuteReflection( ));
    rr.setRouteStarted(new DateTime( ));
  }
}
```

What is claimed is:

1. A CRON-based routing process to schedule and execute Java code excerpts across backend fault-tolerant load-balanced distributed servers running Java Virtual Machine (JVM) namespaces comprising the steps of:

(a) loading, by a first client into routing table on a CRON server, a first job request containing first fields for a first CRON execution time, a first namespace, a first route name, and first code location indicia identifying a first disk location, a first Jar file containing first partial Java code, a first Java class, and a first Java method;

(b) loading, by a second client into the routing table on the CRON server, a second job request containing second fields for a second CRON execution time, a second namespace, a second route name, and second code location indicia identifying a second disk location, a second Jar file containing second partial Java code, a second Java class, and a second Java method;

(c) loading, by a third client into the routing table on the CRON server, a third job request containing third fields for a third CRON execution time, a third namespace, a third route name, and third code location indicia identifying a third disk location, a third Jar file containing third partial Java code, a third Java class, and a third Java method;

(d) loading, by a fourth client into the routing table on the CRON server, a fourth job request containing fourth fields for a fourth CRON execution time, a fourth namespace, a fourth route name, and fourth code location indicia identifying a fourth disk location, a fourth Jar file containing fourth partial Java code, a fourth Java class, and a fourth Java method;
(e) electing, by the CRON server, a first server as a primary server;
(f) assigning, by the CRON server as secondary servers, a second server, a third server, and a fourth server;
(g) storing, by the CRON server in a server and IP address table, a server identifier, a primary/secondary designation, and an IP address for each of said first server, said second server, said third server, and said fourth server;
(h) allocating, by the primary server to itself and by the primary server to the secondary servers, a first JVM namespace on the primary server, a second JVM namespace on the second server, a third JVM namespace on the third server, and a fourth JVM namespace on the fourth server;
(i) executing, in the first JVM namespace at said first CRON execution time, said first partial Java code from the first Jar file to extract first data from one or more backend machines;
(j) executing, in the second JVM namespace at said second CRON execution time, said second partial Java code from the second Jar file to extract second data from said one or more backend machines;
(k) executing, in the third JVM namespace at said third CRON execution time, said third partial Java code from the third Jar file to extract third data from said one or more backend machines;
(l) executing, in the fourth JVM namespace at said fourth CRON execution time, said fourth partial Java code from the fourth Jar file to extract fourth data from said one or more backend machines;
(m) transforming, by the first JVM namespace, the first data into first frontend data;
(n) transforming, by the second JVM namespace, the second data into second frontend data;
(o) transforming, by the third JVM namespace, the third data into third frontend data;
(p) transforming, by the fourth JVM namespace, the fourth data into fourth frontend data;
(q) loading, by the first server, the first frontend data into frontend-accessible data storage;
(r) loading, by the second server, the second frontend data into said frontend-accessible data storage;
(s) loading, by the third server, the third frontend data into said frontend-accessible data storage;
(t) loading, by the fourth server, the fourth frontend data into said frontend-accessible data storage;
(u) retrieving, by a frontend computer from said frontend-accessible data storage in response to a request from a user, said first frontend data, said second frontend data, said third frontend data, or said fourth frontend data; and
(v) displaying, by the frontend computer, said frontend-accessible data to the user.

2. The CRON-based routing process to schedule and execute Java code excerpts across backend fault-tolerant load-balanced distributed servers running Java Virtual Machine (JVM) namespaces of claim 1 wherein one or more of said primary and secondary servers contain one or more additional JVM namespaces for execution of one or more additional routes in the routing table.

3. The CRON-based routing process to schedule and execute Java code excerpts across backend fault-tolerant load-balanced distributed servers running Java Virtual Machine (JVM) namespaces of claim 2 wherein route data is provided by the CRON server to the primary and secondary servers to start the first JVM namespace, the second JVM namespace, the third JVM namespace, and the fourth JVM namespace.

4. The CRON-based routing process to schedule and execute Java code excerpts across backend fault-tolerant load-balanced distributed servers running Java Virtual Machine (JVM) namespaces of claim 3 wherein the route data is stored on the CRON server.

5. The CRON-based routing process to schedule and execute Java code excerpts across backend fault-tolerant load-balanced distributed servers running Java Virtual Machine (JVM) namespaces of claim 4 further comprising the steps of:
(a) receiving, by the CRON server, periodic heartbeat messages from the first server, second server, third server, and fourth server;
(b) detecting, by the CRON server based on a failure to receive one of said periodic heartbeat messages, a fault condition in said primary server;
(c) designating, by the CRON server, the primary server as inactive in the server and IP address table;
(d) electing, by the CRON server, a new primary server;
(e) updating, the server and IP address table by the CRON server, with a new primary server identifier and new IP address; and
(f) reassigning, by the new primary server, the first JVM namespace to one of said secondary servers.

6. The CRON-based routing process to schedule and execute Java code excerpts across backend fault-tolerant load-balanced distributed servers running Java Virtual Machine (JVM) namespaces of claim 5 wherein route data is provided by the CRON server to the primary and secondary servers to start child JVM namespaces.

7. The CRON-based routing process to schedule and execute Java code excerpts across backend fault-tolerant load-balanced distributed servers running Java Virtual Machine (JVM) namespaces of claim 6 in which loads are balanced based on resource consumption requirements for each of said first JVM namespace, said second JVM namespace, said third JVM namespace, said fourth JVM namespace, said one or more additional JVM namespaces, and said child JVM namespaces.

8. The CRON-based routing process to schedule and execute Java code excerpts across backend fault-tolerant load-balanced distributed servers running Java Virtual Machine (JVM) namespaces of claim 7 wherein the first frontend data, the second frontend data, the third frontend data, or the fourth frontend data is displayed in a dashboard or in a web page.

9. The CRON-based routing process to schedule and execute Java code excerpts across backend fault-tolerant load-balanced distributed servers running Java Virtual Machine (JVM) namespaces of claim 8 wherein the transforming steps transform—by sanitizing—the first data, the second data, the third data, and the fourth data respectively into the first frontend data, the second frontend data, the third frontend data, and the fourth frontend data.

10. The CRON-based routing process to schedule and execute Java code excerpts across backend fault-tolerant load-balanced distributed servers running Java Virtual Machine (JVM) namespaces of claim 9 wherein the transforming steps transform—by converting into a common format—the first data, the second data, the third data, and the fourth data respectively into the first frontend data, the second frontend data, the third frontend data, and the fourth frontend data.

11. The CRON-based routing process to schedule and execute Java code excerpts across backend fault-tolerant load-balanced distributed servers running Java Virtual Machine (JVM) namespaces of claim 10 wherein the loading of the routing table on the CRON server is performed by the user typing text into a command line interface on one of said clients.

12. The CRON-based routing process to schedule and execute Java code excerpts across backend fault-tolerant load-balanced distributed servers running Java Virtual Machine (JVM) namespaces of claim 11 wherein the loading of the routing table on the CRON server is performed by the user uploading a load file via a graphical user interface on one of said clients.

13. The CRON-based routing process to schedule and execute Java code excerpts across backend fault-tolerant load-balanced distributed servers running Java Virtual Machine (JVM) namespaces of claim 12 wherein the loading of the routing table on the CRON server is performed by the user entering load data into load fields in a graphical user interface displayed on one of said clients.

14. The CRON-based routing process to schedule and execute Java code excerpts across backend fault-tolerant load-balanced distributed servers running Java Virtual Machine (JVM) namespaces of claim 13 in which the steps are implemented as computer-executable instructions stored on computer-readable media.

15. A CRON-based routing process to schedule and execute Java code excerpts across backend fault-tolerant load-balanced distributed servers comprises the steps of:
(a) importing, to a CRON server, a routing table containing routes to be executed in Java Virtual Machine (JVM) namespaces, each of said routes identifying a Jar file in which one or more classes having one or more methods are to be executed with one or more parameters at CRON times corresponding to said routes;
(b) electing, by the CRON server, a primary server;
(c) designating, by the CRON server, a plurality of secondary servers;
(d) allocating, by the primary server, the JVM namespaces across the primary server and the secondary servers;
(e) starting, by the primary server and the secondary servers at the CRON times, the routes to be executed in the JVM namespaces;
(f) executing, within the JVM namespaces, said one or more methods in one or classes using said one or more parameters at the CRON times for each of said routes in order to extract backend data from backend sources;
(g) transforming, by the primary server and the secondary servers, the backend data into frontend data; and
(h) loading, by the primary server and the secondary servers, the frontend data into frontend-accessible storage to make available for frontend clients.

16. The CRON-based routing process to schedule and execute Java code excerpts across backend fault-tolerant load-balanced distributed servers of claim 15 in which each said Jar file only contains said one or more classes and said one or more methods for the Jar file's corresponding said route.

17. The CRON-based routing process to schedule and execute Java code excerpts across backend fault-tolerant load-balanced distributed servers of claim 16 in which the steps are implemented as computer-executable instructions stored on computer-readable media.

18. A CRON-based routing process to schedule and execute Java code excerpts across backend fault-tolerant load-balanced distributed servers comprises the steps of:
(a) loading, to a routing table on a CRON server, a first route to be executed in a first Java Virtual Machine (JVM) namespace, said first route identifying a first classpath and a first Jar file in which a first class having one or more first methods are to be executed with one or more first parameters at a first CRON time;
(b) loading, to a routing table on a CRON server, a second route to be executed in a second Java Virtual Machine (JVM) namespace, said second route identifying second classpath and a first Jar file in which a second class having one or more second methods are to be executed with one or more second parameters at a second CRON time;
(c) electing, by the CRON server, a primary server;
(d) designating, by the CRON server, a secondary server;
(e) allocating, by the primary server, the first JVM namespace for the first route to the primary server and the second JVM namespace for the second route to the secondary server;
(f) starting the first route in the first JVM namespace and the second route in the second JVM namespace;
(g) utilizing, by the first JVM namespace at the first CRON time, the first classpath to find the first class in the first Jar;
(h) retrieving, by the first JVM namespace, said one or more first methods and said one or more first parameters for said first route;
(i) executing, by the first JVM namespace for said first route, said one or more first methods using said one or more first parameters to extract first backend data from one or more first backend devices;
(j) transforming, by the primary server, the first backend data into first frontend data;
(k) loading, by the primary server into frontend storage, the first frontend data;
(l) utilizing, by the second JVM namespace at the second CRON time, the second classpath to find the second class in the second Jar;
(m) retrieving, by the second JVM namespace, said one or more second methods and said one or more second parameters for said second route;
(n) executing, by the second JVM namespace for said second route, said one or more second methods using said one or more second parameters to extract second backend data from one or more second backend devices;
(o) transforming, by the primary server, the second backend data into second frontend data; and
(p) loading, by the secondary server into said frontend storage, the second frontend data.

19. The CRON-based routing process to schedule and execute Java code excerpts across backend fault-tolerant load-balanced distributed servers of claim 18 in which the first Jar file only contains for said first route execution the first class and said one or more first methods, and the second Jar file only contains for said second route execution the second class and said one or more second methods.

20. The CRON-based routing process to schedule and execute Java code excerpts across backend fault-tolerant load-balanced distributed servers of claim 19 in which the steps are implemented as computer-executable instructions stored on computer-readable media.

\* \* \* \* \*